(12) United States Patent
Kim et al.

(10) Patent No.: US 9,340,179 B2
(45) Date of Patent: May 17, 2016

(54) ACTIVE HOOD APPARATUS FOR VEHICLE

(71) Applicants: Hyundai Motor Company, Seoul (KR); Kia Motors Corporation, Seoul (KR); Pyeong Hwa Automotive Co., Ltd., Daegu (KR)

(72) Inventors: Sang Il Kim, Whasung-Si (KR); Seong Tae Hong, Whasung-Si (KR)

(73) Assignees: Hyundai Motor Company, Seoul (KR); Kia Motor Corp., Seoul (KR); Pyeong Hwa Automotive Co., Ltd., Daegu (KR)

( * ) Notice: Subject to any disclaimer, the term of this patent is extended or adjusted under 35 U.S.C. 154(b) by 0 days.

(21) Appl. No.: 14/102,292

(22) Filed: Dec. 10, 2013

(65) Prior Publication Data

US 2015/0107927 A1    Apr. 23, 2015

(30) Foreign Application Priority Data

Oct. 21, 2013 (KR) .......................... 10-2013-0125625

(51) Int. Cl.
*B60R 21/38* (2011.01)
*E05D 3/02* (2006.01)
*E05D 7/10* (2006.01)
*E05D 7/12* (2006.01)

(52) U.S. Cl.
CPC .............. *B60R 21/38* (2013.01); *E05D 3/022* (2013.01); *E05D 7/1061* (2013.01); *E05D 7/121* (2013.01); *E05Y 2800/252* (2013.01); *E05Y 2900/536* (2013.01)

(58) Field of Classification Search
CPC ......... B60R 21/38; E05B 77/08; E05B 83/24; E05D 7/1061; E05D 3/022; E05D 7/121; E05Y 2900/536; E05Y 2800/252
See application file for complete search history.

(56) References Cited

U.S. PATENT DOCUMENTS

| | | | | |
|---|---|---|---|---|
| 8,579,068 B2 * | 11/2013 | Farooq et al. | ................. | 180/274 |
| 8,584,787 B2 * | 11/2013 | Hwang | .................... | 180/274 |
| 2002/0011371 A1 * | 1/2002 | Sasaki | .................... | B60R 21/38 180/274 |
| 2006/0006660 A1 * | 1/2006 | Seo | ................................. | 292/24 |
| 2007/0062748 A1 * | 3/2007 | Erwin | ........................ | 180/69.21 |
| 2007/0151791 A1 * | 7/2007 | Gust | ............................. | 180/274 |
| 2007/0246944 A1 * | 10/2007 | Sundararajan et al. | ......... | 292/92 |

(Continued)

FOREIGN PATENT DOCUMENTS

| | | |
|---|---|---|
| EP | 182748 A2 * | 5/1986 |
| KR | 10-0946502 B1 | 3/2010 |
| KR | 10-2010-0055932 A | 5/2010 |

(Continued)

*Primary Examiner* — Drew Brown
(74) *Attorney, Agent, or Firm* — Morgan, Lewis & Bockius LLP (57) ABSTRACT

An active hood apparatus for a vehicle may include a vehicle body bracket including a guide slot formed upwardly, an operation pin having one end configured to be inserted and slid into the guide slot and the other end connected to a hood by a link, an operation link pivotally coupled to the vehicle body bracket by a hinge pin and having one end configured for contacting the one end of the operation pin to slide the one end of the operation pin upwardly along the guide slot simultaneously with moving the operation pin in a length direction of one end at the time of being rotated, and an inflator rotating the operation link at the time of applying an operation signal thereto.

16 Claims, 5 Drawing Sheets

(56) References Cited

U.S. PATENT DOCUMENTS

| | | | | |
|---|---|---|---|---|
| 2008/0156556 | A1* | 7/2008 | Takahashi | B62D 25/12 180/69.21 |
| 2013/0033069 | A1* | 2/2013 | Hwang | B60R 21/38 296/187.04 |
| 2013/0300134 | A1* | 11/2013 | Jayasuriya et al. | 292/129 |
| 2015/0054293 | A1* | 2/2015 | Kim | E05B 77/08 292/92 |

FOREIGN PATENT DOCUMENTS

| | | |
|---|---|---|
| KR | 10-1154299 B1 | 4/2012 |
| KR | 10-2013-0014725 A | 2/2013 |
| KR | 10-2013-0018058 A | 2/2013 |
| KR | 10-2013-0018059 A | 2/2013 |
| KR | 10-2013-0049922 A | 5/2013 |
| KR | 10-1491316 B1 | 2/2015 |

\* cited by examiner

ACTIVE HOOD APPARATUS FOR VEHICLE

CROSS REFERENCE TO RELATED APPLICATION

The present application claims priority to Korean Patent Application No. 10-2013-0125625, filed on Oct. 21, 2013, the entire contents of which is incorporated herein for all purposes by this reference.

BACKGROUND OF THE INVENTION

1. Field of the Invention

The present invention relates to an active hood apparatus for a vehicle capable of decreasing impact applied to a pedestrian by instantaneously lifting a hood of the vehicle when the vehicle collides with the pedestrian.

2. Description of Related Art

Generally, a front portion of a vehicle is provided with an engine room, which is opened and closed by a hood. In the hood, which is a component serving to open and close the engine room and shield the engine room to block engine noise, both sides (left and right) of a rear end portion are coupled to an upper portion of the engine room via a hinge assembly, respectively, and are rotated around the hinge assembly to open and close the engine room.

However, it has been known that the hood is a part injuring a pedestrian when collision with the pedestrian occurs. Therefore, recently, in order to protect the pedestrian, an active hood system allowing a space capable of absorbing impact energy to the pedestrian at the time of collision with the pedestrian to be secured between the hood and the engine room has been applied.

The active hood system, which is a system lifting the hood in order to protect the pedestrian at the time of collision with the pedestrian, is a kind of safety apparatus for protecting the pedestrian, lifting the hood at the time of collision with the pedestrian to secure a space between the hood and the engine room to buffer impact of the pedestrian and prevent the pedestrian from colliding with electronic components of the engine room, thereby making it possible to decrease injury to the pedestrian.

Usually, in the active hood system, when a sensor mounted in a front bumper senses collision between the pedestrian and the front bumper at the time of the collision between the pedestrian and the front bumper, a controller operates an actuator depending on a signal sensed by the sensor to lift a rear end portion of the hood, thereby securing a buffering space between the hood and the engine room.

Particularly, an actuator according to the related art has used a scheme of lifting the hood using elastic force of a spring disposed therein. However, the mechanical type actuator as described above can not but have a large size and a heavy weight and be expensive due to components such as the spring, an internal latch, and the like. In addition, an operation speed has been restrictive due to a limitation of the elastic force of the spring and a malfunction has occurred due to a mechanical error.

The matters described as the related art have been provided only for assisting in the understanding for the background of the present invention and should not be considered as corresponding to the related art known to those skilled in the art.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an active hood apparatus for a vehicle capable of having an improved size, weight, production cost, operation speed, and the like, by using an explosion type actuator and simplifying an internal fastening structure.

In an aspect of the present invention, an active hood apparatus for a vehicle, may include a vehicle body bracket including a guide slot formed upwardly, an operation pin having one end configured to be inserted and slid into the guide slot and the other end connected to a hood by a link, an operation link pivotally coupled to the vehicle body bracket by a hinge pin and having one end configured for contacting the one end of the operation pin to slide the one end of the operation pin upwardly along the guide slot simultaneously with moving the operation pin in a length direction of one end at the time of being rotated, and an inflator rotating the operation link at the time of applying an operation signal thereto.

The guide slot may have an outwardly opened upper portion.

The operation link is installed on a front side of the vehicle body bracket, wherein the hinge pin penetratedly couples a central portion of the operation link and a portion of the vehicle body bracket under the guide slot to each other.

One end of the operation link is provided with a hook bent toward the other side thereof.

The active hood apparatus for the vehicle may further include a holding link provided on a rear side of the vehicle body bracket, wherein the holding link may include one end coupled to the vehicle body bracket by a first pin, and a catching groove formed at the other end thereof so as to be selectively coupled to the operation pin.

The active hood apparatus may further include a fastening link provided on the rear side of the vehicle body bracket, wherein the fastening link may have one end coupled to the vehicle body bracket by a second pin, and a groove formed in the other end thereof to be selectively fastened to the other end of the holding link.

The active hood apparatus may further include an elastic member having one end coupled to a lower end portion of the vehicle body bracket and the other end connected to the other end of the fastening link to press the fastening link toward the holding link.

The other end of the fastening link is provided with a protrusion pin protruding on a front side of the vehicle body bracket while penetrating through the vehicle body bracket.

The vehicle body bracket is provided with a slot in a rotation direction of the fastening link so that the protrusion pin is coupled thereto and slid therein.

A side portion of the operation link is provided with a support groove so as to be selectively caught by the protrusion pin, the support groove pressing the protrusion pin when the operation link is rotated, thereby allowing the protrusion pin to be slid along the slot.

The inflator presses the other end of the operation link at the time of being exploded to rotate the operation link.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an active hood apparatus for a vehicle according to an exemplary embodiment of the present invention will be described with reference to the accompanying drawings.

Figure 1:
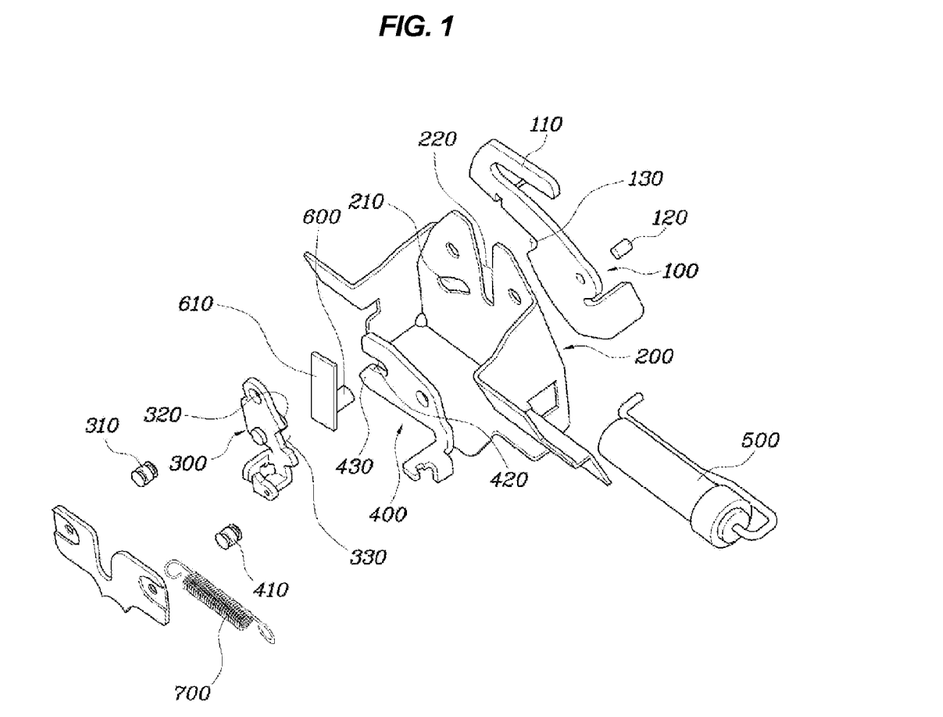
FIG. 1 is an exploded view of an active hood apparatus for a vehicle according to an exemplary embodiment of the present invention.

FIG. 1 is an exploded view of an active hood apparatus for a vehicle according to an exemplary embodiment of the present invention. The active hood apparatus for a vehicle according to the exemplary embodiment of the present invention is configured to include a vehicle body bracket 200 provided at an engine room side of a vehicle body and provided with a guide slot 220 formed upwardly, an operation pin 600 having one end inserted and slid into the guide slot 220 and the other end connected to a hood 10 by a link 610, an operation link 100 coupled to the vehicle body bracket 200 by a hinge pin 120 and having one end contacting one end of the operation pin 600 to slide one end of the operation pin 600 upwardly along the guide slot 220 simultaneously with moving the operation pin 600 in a length direction of one end at the time of being rotated, and an inflator 500 rotating the operation link 100 at the time of applying an operation signal.

The guide slot 220 may be positioned at a central portion of the vehicle body bracket 200 and have an outwardly opened upper portion.

Meanwhile, the operation link 100 may be installed on a front side of the vehicle body bracket 200, and the hinge pin 120 may penetratedly couple a central portion of the operation link 100 and a portion of the vehicle body bracket 200 under the guide slot 220 to each other.

That is, it is preferable that the operation link 100 is installed on the vehicle body bracket 200, particularly, on a portion of the vehicle body bracket 200 positioned under the guide slot 220. Here, the closer to the guide slot 220 the position at which the hinge pin 120 penetratedly couples the operation link 100 and the vehicle body bracket 200 to each other, the more preferable. The reason is that the operation pin 600 is positioned at a lower end of the guide slot 220 at a normal time, such that when the operation pin 600 is in the state in which it contacts the central portion of the operation link 100, a distance at which the operation pin 600 may move in the length direction of one end of the operation link 100 at the time of rotation of the operation link 100 may be increased. That is, since a length at which the operation pin 600 may be pressed upwardly may be further increased by the rotation of the operation link 100, a length at which the operation pin 600 may move along the guide slot 220 may also be increased. As a result, a width at which the hood is lifted may be increased.

Meanwhile, one end of the operation link 100 may be provided with a hook 110 bent toward the other side.

Since the upper portion of the guide slot 220 is opened, one end of the operation link 100 may be provided with the hook 110 bent toward the other side so as to prevent the operation pin 600 from deviating from the slot 220 to move to the outside of the vehicle body bracket 200. In addition, when the operation link 100 is rotated, such that the operation pin 600 is positioned at an upper end of the guide slot 220, the operation pin 600 contacts the hook 110 of the operation link 100 and is caught by the hook 110, such that the operation pin 600 may not move upward any more. Therefore, the operation pin 600 may always move in a limited range by the hook 110 and prevent the hood from being expanded upwardly by explosion force of the inflator 500.

Meanwhile, the active hood apparatus for a vehicle according to the exemplary embodiment of the present invention may further include a holding link 400 provided on a rear side of the vehicle body bracket 200, having one end coupled to the vehicle body bracket 200 by a first pin 410, and having a catching groove 420 formed at the other end thereof so as to be coupled to the operation pin 600 in a catching structure.

It is preferable that the catching groove 420 is in the state in which it is coupled to the operation pin 600 at a normal time, thereby preventing the hood from moving upwardly and is separated from the operation pin 600 when the operation pin 600 is slid upwardly along the guide slot 220 by the rotation of the operation link 100 at the time of an operation of the inflator 500, thereby allowing the operation pin 600 to be continuously slid upwardly along the guide slot 220.

Therefore, it is preferable that the holding link 400 has a length enough not to be continuously maintained in the state in which it is coupled to the operation pin 600 even at the time of sliding the operation pin 600.

The holding link 400 is provided as described above to fix the hood at a normal time and allow the operation pin 600 to be freely slid upwardly along the guide slot 220 without any hindrance at the time of an operation of the inflator 500, thereby making it possible to allow the explosion force of the inflator 500 to be applied in lifting the hood without any hindrance.

Meanwhile, the active hood apparatus for a vehicle according to the exemplary embodiment of the present invention may further include a fastening link 300 provided on the rear side of the vehicle body bracket 200, having one end coupled to the vehicle body bracket 200 by a second pin 310, and having a groove 330 formed in the other end thereof to thereby be fastened to the other end of the holding link 400.

It is preferable that the fastening link 300 is installed so that the other end thereof faces the other end of the holding link 400, and the groove 330 is maintained in the state in which it is coupled to the other end of the holding link 400 at a normal time, thereby preventing rotation of the holding link 400 and releases the state in which it is coupled to the other end of the holding link 400 at the time of the rotation of the operation link 100, thereby allowing the holding link 400 to be freely rotated.

To this end, it is preferable that a lower end portion of the other end of the holding link 400 is provided with a protrusion part 430 protruding toward the groove 330 so as to be coupled to the groove 330.

Meanwhile, the active hood apparatus for a vehicle according to the exemplary embodiment of the present invention may further include an elastic member 700 having one end coupled to a lower end portion of the vehicle body bracket 200 and the other end connected to the other end of the fastening link 300 to press the fastening link 300 toward the holding link 400, wherein it is preferable that one end of the elastic member 700 is provided on the rear side of the vehicle body bracket 200 and is fixed to a lower end portion of the vehicle body bracket 200 positioned at a lower side of the holding link 400.

Due to the elastic member 700, the groove 330 may be always maintained in the state in which it is coupled to the protrusion part 430 at a normal time to allow the fastening link 300 to prevent the rotation of the holding link 400.

Here, it is preferable that the elastic member 700 is a spring applying compression recovering force at the time of being extended.

Meanwhile, the other end of the fastening link 300 may be provided with a protrusion pin 320 protruding on the front side of the vehicle body bracket 200 while penetrating through the vehicle body bracket 200. More specifically, the protrusion pin 320 may be formed on a surface of the fastening link 300 facing the vehicle body bracket 200, and the vehicle body bracket 200 may be provided with a slot 210 in a rotation direction of the fastening link 300 so that the protrusion pin 320 may be coupled thereto and slid therein.

That is, the protrusion pin 320 may protrude on the front side of the vehicle body bracket 200 while penetrating through the slot 210. Since the slot 210 is formed in the rotation direction of the fastening link 300, when the protrusion pin 320 is slid along the slot 210, the fastening link 300 may also be rotated to release the coupling with the holding link 400.

Therefore, a side portion of the operation link 100 is provided with a support groove 130 so as to be caught by the protrusion pin 320, wherein it is preferable that the support groove 130 presses the protrusion pin 320 when the operation link 100 is rotated, thereby allowing the protrusion pin 320 to be slid along the slot 210.

Meanwhile, the actuator, i.e., the inflator 500 may press the other end of the operation link 100 at the time of being exploded to rotate the operation link 100 and receive an operation signal applied from a controller such as an electronic control unit (ECU) of the vehicle thereto when impact is applied to an outer portion thereof. When the operation signal is applied to the actuator, the actuator may be exploded and press the other end of the operation link 100.

Here, the actuator, i.e., the inflator 500 is preferably an explosion type actuator, but is not necessarily limited thereto.

Hereinafter, an operation process of the active hood apparatus for a vehicle according to the exemplary embodiment of the present invention will be described with reference to FIGS. 2A to 5.

Figure 2A:
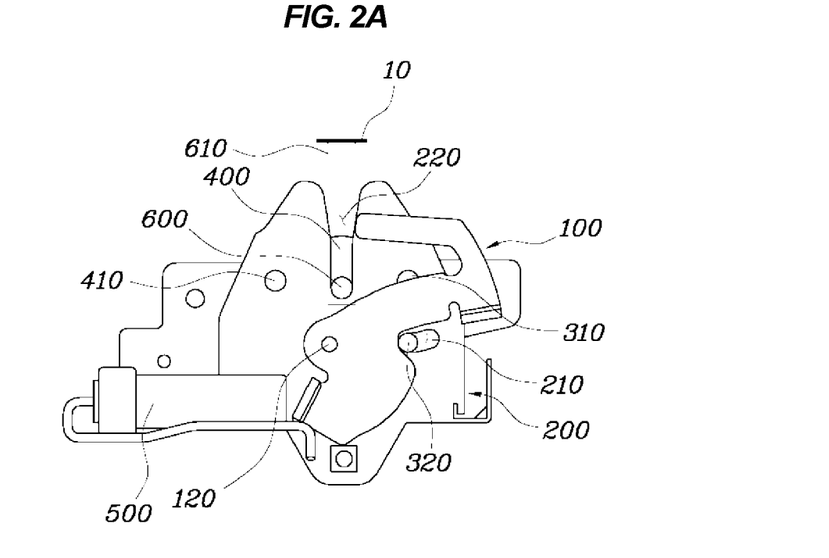
FIGS. 2A and 2B are views of the front side part and the rear side part, respectively, showing a form of the active hood apparatus for a vehicle according to the exemplary embodiment of the present invention before being operated.
Figure 2B:
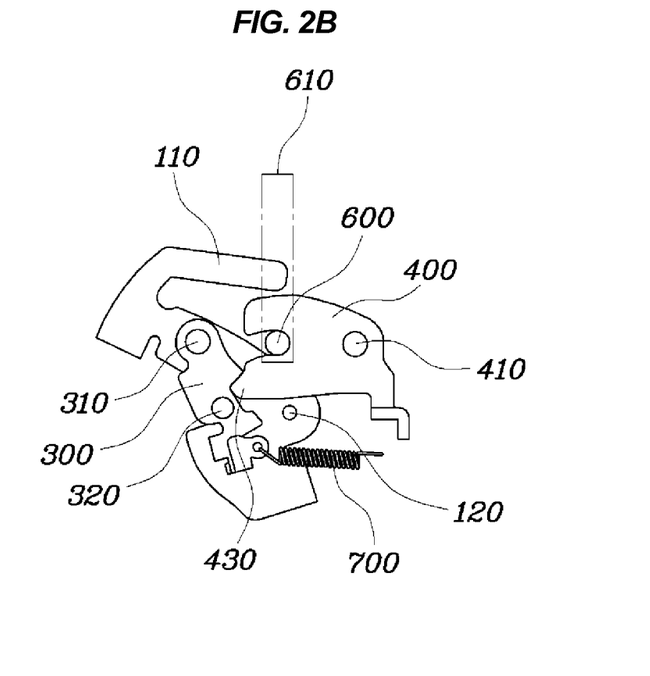

First, FIGS. 2A and 2B are views showing a form of the active hood apparatus for a vehicle according to the exemplary embodiment of the present invention before being operated, wherein FIG. 2A shows a front side part. FIG. 2B shows a rear side part. Since this state is a state before the actuator, i.e., the inflator 500 is operated, the fastening link 300 is in the state in which it is coupled to the holding link 400, the operation pin 600 is fixed so as not to be slid upwardly, and the operation link 100 is also maintained in the state in which it does not contact the operation pin 600.

Figure 3A:
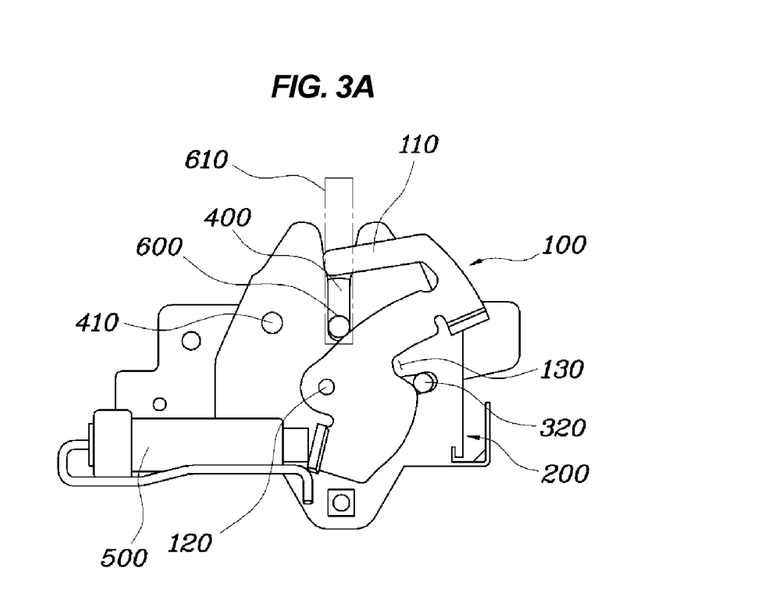
FIGS. 3A and 3B are views of the front side part and the rear side part, respectively, showing a first operation step of the active hood apparatus for a vehicle according to the exemplary embodiment of the present invention.
Figure 3B:
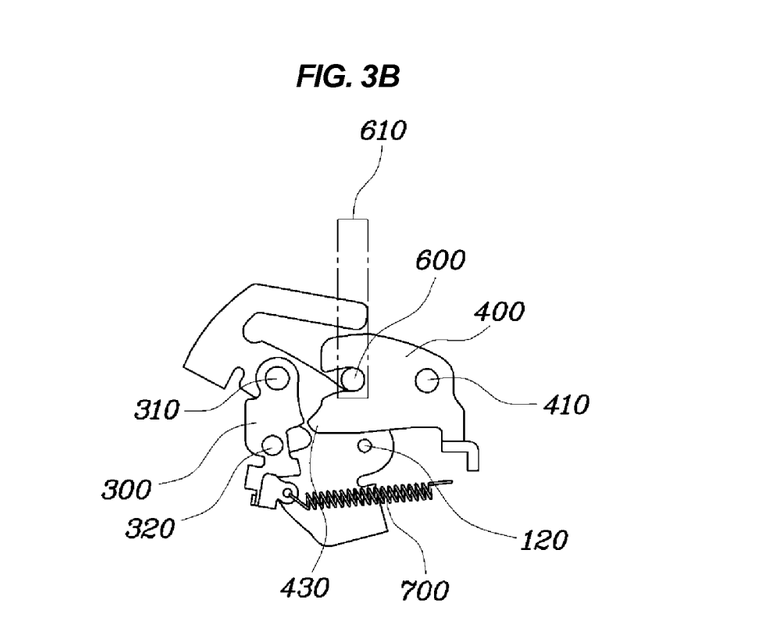

Then, when the operation signal is applied from the outside to the actuator, i.e. the inflator 500 due to collision of the vehicle, the actuator starts to be exploded. FIGS. 3A and 3B are views of the front side part and the rear side part, respectively, showing a first operation step of the active hood apparatus for a vehicle according to the exemplary embodiment of the present invention. In the first operation step, the actuator presses the other end of the operation link 100 to rotate the operation link 100, and the support groove 130 of the operation link 100 presses the protrusion pin 320 due to the rotation of the operation link 100 to slide the protrusion pin 320 from one end of the slot 210 to the other end of the slot 210 along the slot 210.

Since the protrusion pin 320 is slid to the other side, the fastening link 300 is rotated to the other side of the slot 210, such that the groove 330 releases the coupling with the protrusion part 430. Therefore, the holding link 400 is in the state in which it may be freely rotated.

Figure 4A:
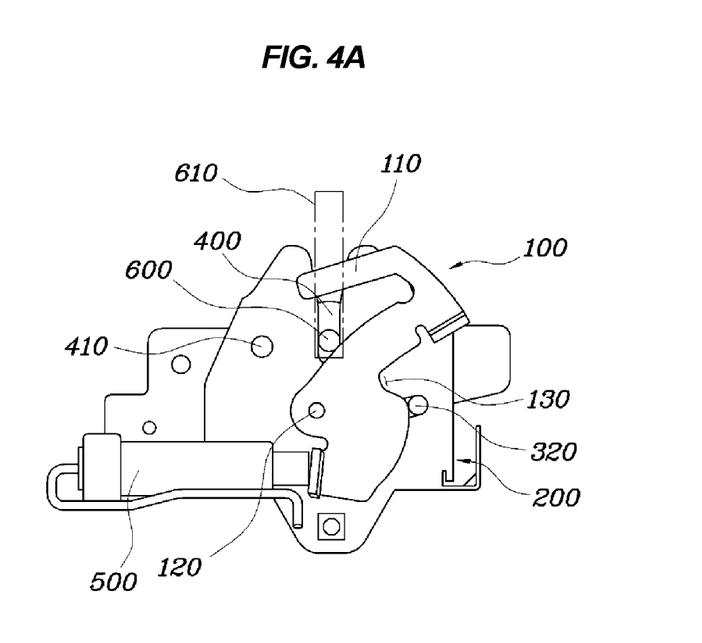
FIGS. 4A and 4B are views of the front side part and the rear side part, respectively, showing a second operation step of the active hood apparatus for a vehicle according to the exemplary embodiment of the present invention.
Figure 4B:
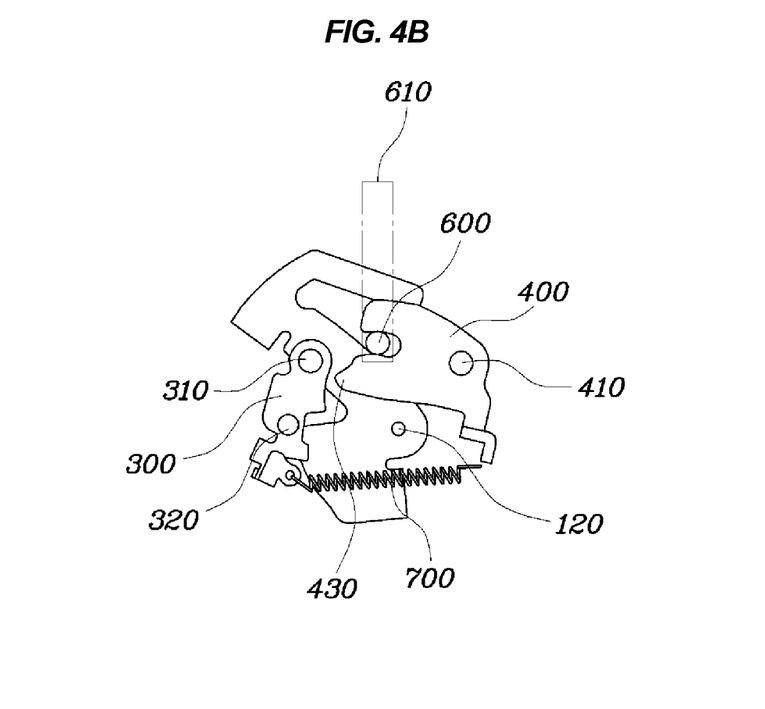

Then, FIGS. 4A and 4B are views of the front side part and the rear side part, respectively, showing a second operation step of the active hood apparatus for a vehicle according to the exemplary embodiment of the present invention. In the second operation state, the operation link 100 is in the state in which it is further rotated by explosion of the inflator 500. In this case, one end of the operation link 100 contacts the operation pin 600 to press the operation pin 600 upwardly, and the holding link 400 may be freely rotated, such that it is rotated together with the operation pin 600 when the operation pin 600 is slid. As the operation pin 600 is gradually slid upwardly, it is gradually separated from the catching groove 420.

Figure 5A:
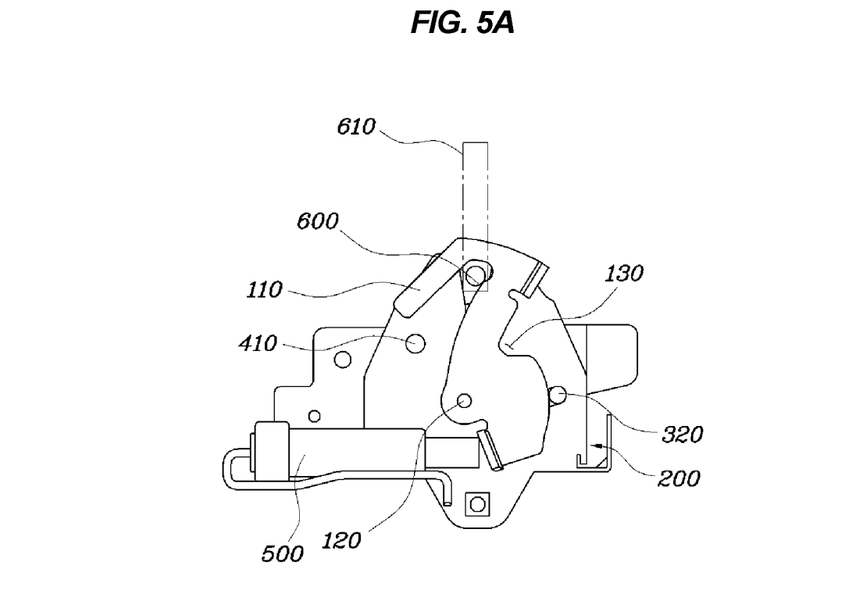
FIGS. 5A and 5B are views of the front side part and the rear side part, respectively, showing a third operation step of the active hood apparatus for a vehicle according to the exemplary embodiment of the present invention.
Figure 5B:
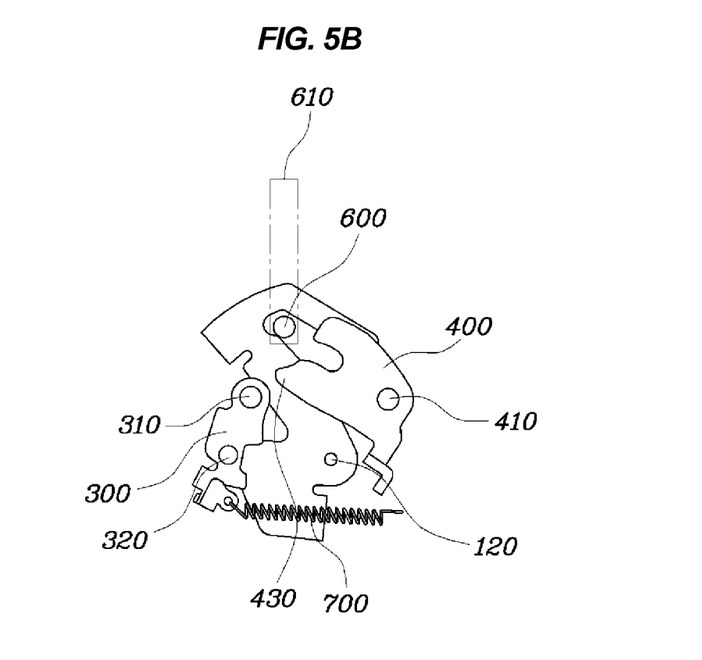

Finally, FIGS. 5A and 5B are views of the front side part and the rear side part, respectively, showing a third operation step of the active hood apparatus for a vehicle according to the exemplary embodiment of the present invention. In the third operation step, the explosion of the inflator 500 reaches the peak, such that the operation pin 600 is positioned at the highest height of the guide slot 220 to lift the hood at the highest height, and the hook 110 is coupled to the operation pin 600 to allow the operation pin 600 not to be raised any more. Therefore, the operation link 100 stops without being rotated any more.

In this case, it is preferable that the operation pin 600 is in the state in which it is completely separated from the catching groove 420.

With the active hood apparatus for a vehicle having the structure as described above, force for lifting the hood is obtained from the explosion force of the inflator 500 rather than a spring, thereby making it possible to significantly decrease a space occupied by the actuator. As a result, an active hood may be installed in various kinds of vehicles including a small vehicle.

In addition, a production cost and a weight may be significantly decreased due to a decrease in a size and simplification of internal components.

Further, the explosion force using explosion instead of an irregular spring force according to the related art is provided to improve the entire operation speed of the actuator, thereby making it possible to improve protection performance of a pedestrian.

Therefore, the number of components is decreased, thereby making it possible to simplify a production process.

Further, the electrically operated inflator 500 is used, thereby making it possible to prevent a malfunction of an apparatus.

For convenience in explanation and accurate definition in the appended claims, the terms "upper", "lower", "inner" and "outer", are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An active hood apparatus for a vehicle, comprising:
    a vehicle body bracket including a guide slot formed upwardly;
    an operation pin having a first end configured to be inserted and slid into the guide slot and the other end connected to a hood by a link;
    an operation link pivotally coupled to the vehicle body bracket by a hinge pin and having a first end configured for contacting the first end of the operation pin to slide the first end of the operation pin upwardly along the guide slot simultaneously with moving the operation pin in a length direction of the operation link at the time of being rotated; and
    an inflator rotating the operation link at the time of applying an operation signal thereto,
    wherein the operation link is installed on a front side of the vehicle body bracket, and
    wherein the hinge pin penetratedly couples a central portion of the operation link and a portion of the vehicle body bracket under the guide slot to each other.

2. The active hood apparatus for the vehicle of claim 1, wherein the guide slot has an outwardly opened upper portion.

3. The active hood apparatus for the vehicle of claim 1, wherein the first end of the operation link is provided with a hook bent toward a second end thereof.

4. The active hood apparatus for the vehicle of claim 1, further comprising a holding link provided on a rear side of the vehicle body bracket, wherein the holding link includes:
    a first end coupled to the vehicle body bracket by a first pin; and
    a catching groove formed at the other end thereof so as to be selectively coupled to the operation pin.

5. The active hood apparatus for the vehicle of claim 4, further comprising a fastening link provided on the rear side of the vehicle body bracket,
    wherein the fastening link has:
        a first end coupled to the vehicle body bracket by a second pin; and
        a groove formed in the other end thereof to be selectively fastened to the other end of the holding link.

6. The active hood apparatus for the vehicle of claim 5, further comprising an elastic member having a first end coupled to a lower end portion of the vehicle body bracket and the other end connected to the other end of the fastening link to press the fastening link toward the holding link.

7. The active hood apparatus for the vehicle of claim 5, wherein the other end of the fastening link is provided with a protrusion pin protruding on a front side of the vehicle body bracket while penetrating through the vehicle body bracket.

8. The active hood apparatus for the vehicle of claim 7, wherein the vehicle body bracket is provided with a slot in a rotation direction of the fastening link so that the protrusion pin is coupled thereto and slid therein.

9. The active hood apparatus for the vehicle of claim 8, wherein a side portion of the operation link is provided with a support groove so as to be selectively caught by the protrusion pin, the support groove pressing the protrusion pin when the operation link is rotated, thereby allowing the protrusion pin to be slid along the slot.

10. The active hood apparatus for the vehicle of claim 1, wherein the inflator presses the other end of the operation link at the time of being exploded to rotate the operation link.

11. An active hood apparatus for a vehicle, comprising:
    a vehicle body bracket including a guide slot formed upwardly;
    an operation pin having a first end configured to be inserted and slid into the guide slot and the other end connected to a hood by a link;
    an operation link pivotally coupled to the vehicle body bracket by a hinge pin and having a first end configured for contacting the first end of the operation pin to slide the first end of the operation pin upwardly along the guide slot simultaneously with moving the operation pin in a length direction of the operation link at the time of being rotated;
    an inflator rotating the operation link at the time of applying an operation signal thereto; and
    a holding link provided on a rear side of the vehicle body bracket, wherein the holding link includes:
        a first end coupled to the vehicle body bracket by a first pin; and
        a catching groove formed at the other end thereof so as to be selectively coupled to the operation pin.

12. The active hood apparatus for the vehicle of claim 11, further comprising a fastening link provided on the rear side of the vehicle body bracket,
    wherein the fastening link has:
        a first end coupled to the vehicle body bracket by a second pin; and
        a groove formed in the other end thereof to be selectively fastened to the other end of the holding link.

13. The active hood apparatus for the vehicle of claim 12, further comprising an elastic member having a first end coupled to a lower end portion of the vehicle body bracket and the other end connected to the other end of the fastening link to press the fastening link toward the holding link.

14. The active hood apparatus for the vehicle of claim 12, wherein the other end of the fastening link is provided with a protrusion pin protruding on a front side of the vehicle body bracket while penetrating through the vehicle body bracket.

15. The active hood apparatus for the vehicle of claim 14, wherein the vehicle body bracket is provided with a slot in a rotation direction of the fastening link so that the protrusion pin is coupled thereto and slid therein.

16. The active hood apparatus for the vehicle of claim 15, wherein a side portion of the operation link is provided with a support groove so as to be selectively caught by the protrusion pin, the support groove pressing the protrusion pin when the operation link is rotated, thereby allowing the protrusion pin to be slid along the slot.

* * * * *